United States Patent [19]
Johnson

[11] Patent Number: 5,883,629
[45] Date of Patent: *Mar. 16, 1999

[54] RECURSIVE AND ANISOTROPIC METHOD AND ARTICLE OF MANUFACTURE FOR GENERATING A BALANCED COMPUTER REPRESENTATION OF AN OBJECT

[75] Inventor: Jeffrey Bowman Johnson, Essex Junction, Vt.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 674,228

[22] Filed: Jun. 28, 1996

[51] Int. Cl.[6] ...................................... G06T 9/00
[52] U.S. Cl. .......................... 345/419; 345/423; 345/428
[58] Field of Search ...................... 345/419–433

[56] References Cited

U.S. PATENT DOCUMENTS

| | | | |
|---|---|---|---|
| 4,674,058 | 6/1987 | Lindbloom et al. | 364/518 |
| 4,694,404 | 9/1987 | Meagher | 364/518 |
| 4,792,954 | 12/1988 | Arps et al. | 371/48 |
| 4,890,242 | 12/1989 | Sinha et al. | 364/518 |
| 4,944,023 | 7/1990 | Imao et al. | 382/37 |
| 5,014,230 | 5/1991 | Sinha et al. | 364/578 |
| 5,086,495 | 2/1992 | Gray et al. | 395/120 |
| 5,101,475 | 3/1992 | Kaufman et al. | 395/124 |
| 5,166,876 | 11/1992 | Cline et al. | 364/413.13 |
| 5,255,352 | 10/1993 | Falk | 395/125 |
| 5,305,430 | 4/1994 | Glassner | 395/127 |
| 5,313,568 | 5/1994 | Wallace et al. | 395/126 |
| 5,327,257 | 7/1994 | Hrytzak et al. | 358/447 |
| 5,345,490 | 9/1994 | Finnigan et al. | 378/4 |
| 5,363,478 | 11/1994 | Fiasconaro | 395/141 |
| 5,408,598 | 4/1995 | Pryor, Jr. | 395/142 |
| 5,418,714 | 5/1995 | Sarver | 364/413.13 |
| 5,455,929 | 10/1995 | Bosshart et al. | 395/500 |
| 5,461,712 | 10/1995 | Chelstowski et al. | 395/164 |

OTHER PUBLICATIONS

Samet "Neighbor Finding Techniques for Images Represented by Quadtrees" *Computer Graphics and Image Processing* pp. 37–57, 1982.

Von Herzent "Applications of Surface Networks to Sampling Problems in Computer Graphic", 1989.

"A Segmentation Based Predictive Image Coder," *IEEE Trans. Image Process.*, vol. 4, 1995,pp. 34–47.

"Supercomputer Algorithms for Efficient Linear Octree Encoding of Three Dimensional Brain Images," *Comput. Methods Programs Biomed.*, vol. 46, 1995, pp. 113–119.

"An Algorithm for Perspective Viewing of Objects Represented by Octrees," *Computer Graphics Forum*, vol. 14, 1995, pp. 59–66.

"Navigation for Digital Actors Based on Synthetic Vision, Memory and Learning," *Comput. & Graphics,* vol. 19, 1995, pp. 7–19.

"Octree Based Automatic Mesh Generation for Non Manifold Domains," *Engineering with Computers,* vol. 11, 1995, pp. 1–14.

(List continued on next page.)

*Primary Examiner*—Almis R. Jankus
*Attorney, Agent, or Firm*—McGinn & Gibb, P.C.; Richard M. Kotulak, Esq.

[57] ABSTRACT

A method for generating a computer representation of a two-dimensional or three-dimensional object featuring recursive and anisotropic division of the representation. A bitree approach is provided for successively dividing into two equal parts any portion of the computer representation of the object. Each subdivision into two parts is accomplished by dividing the portion either horizontally or vertically. The method is implemented over a user interface to an information handling system comprised of one or more processors, a memory system, I/O devices, and an operating system program. Each subdivision of the computer representation of the object is comprised of a data structure that is efficiently stored in the memory system and dynamically updated to contain information about its neighboring subdivisions in order that balancing can be effectively achieved.

13 Claims, 10 Drawing Sheets

OTHER PUBLICATIONS

"Parallel Display of Objects Represented by Linear Octrees," *IEEE Transactions on Parallel and Distribubted Systems,* vol. 6, No. 1, Jan. 1995, pp. 79–85.

"Finite Element Mesh Generation Via Switching Function Representation," *Finite Elements in Analysis and Design,* vol. 5, 1989, pp. 119–130.

"A Modified Quadtree Approach to Finite Element Mesh Generation," *IEEE Computer Graphics and Applications,* vol. 3, 1983, pp. 39–46.

"Efficient Octree Conversion by Connectivity Labeling," *Computer Graphics,* vol. 18, No. 3, Jul. 1984, pp. 43–50.

"On a Method of Binary Picture Representation and Its Application to Data Compression," *IEEE Pattern Analysis and Machine Intelligence,* vol. 2, No. 1, Jan. 1980, pp. 27–35.

"Quadtrees, oct–trees and K–trees: a Generalized Approach to Recursive Decomposition of Euclidean Space," *IEEE Pattern Analysis and Machine Intelligence,* vol. 5, No. 5, Sep. 1983, pp. 533–539.

"Method for Geo–Referencing an Octree Data Structure," *IBM Technical Disclosure Bulletin,* vol. 37, No. 04A, Apr. 1994, p. 375.

"Two–Pass Antialiasing in Constructive Sold Geometry Rendering," *IBM Technical Disclosure Bulletin,* vol. 32, No. 8B, Jan. 1990, pp. 278–279.

"A Hierarchical Spatial Index for Cell Complexes," pp. 105–122.

Computer Graphics Principles and Practice, Second Edition, 1990, pp. 550–552.

"The Cost of Balancing Generalized Quadtrees," *ACM Solid Modeling '95,* pp. 305–311.

"Mesh Optimization for the Numerical Simulation of Ambipolar Transport in Low Lifetime Semiconductor Structures," *Computers Electrical Engineering,* vol. 21, No. 5, 1995, pp. 359–365.

"Representations of Images with Quadtrees," *Advances in Modelling & Analysis, B, AMSE Press,* vol. 32, No. 3, pp. 1–12,1995.

Gregory M. Hunter and Kenneth Steiglitz, "Operations on Images Using Quad Trees", IEEE Transactions on Pattern Analysis and Machine Intelligence, vol. PAMI–1, No. 2, Apr. 1979, pp. 145–153.

FIG. 3A
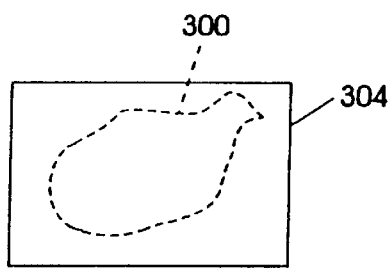
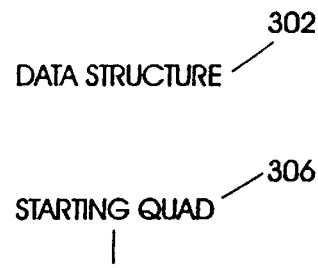
FIG. 3B
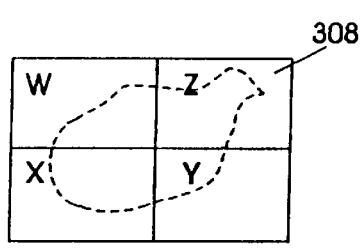
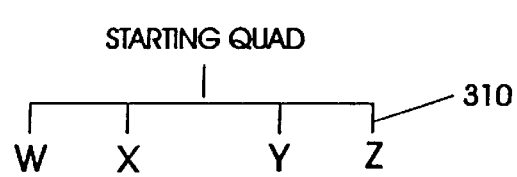
FIG. 3C
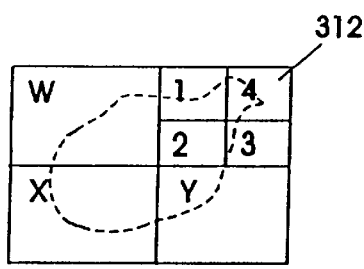
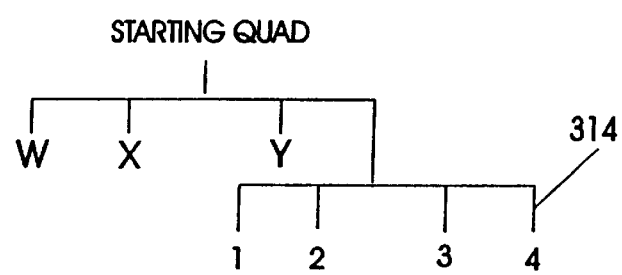

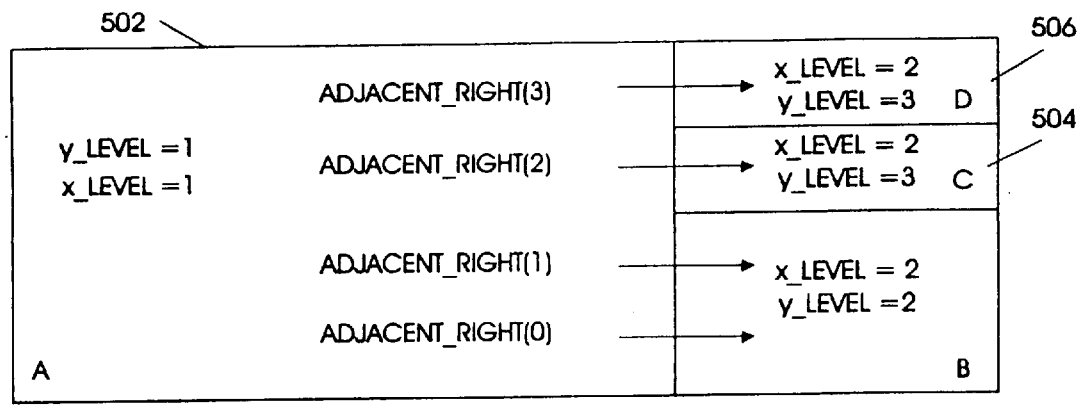
FIG. 5
FIG. 6
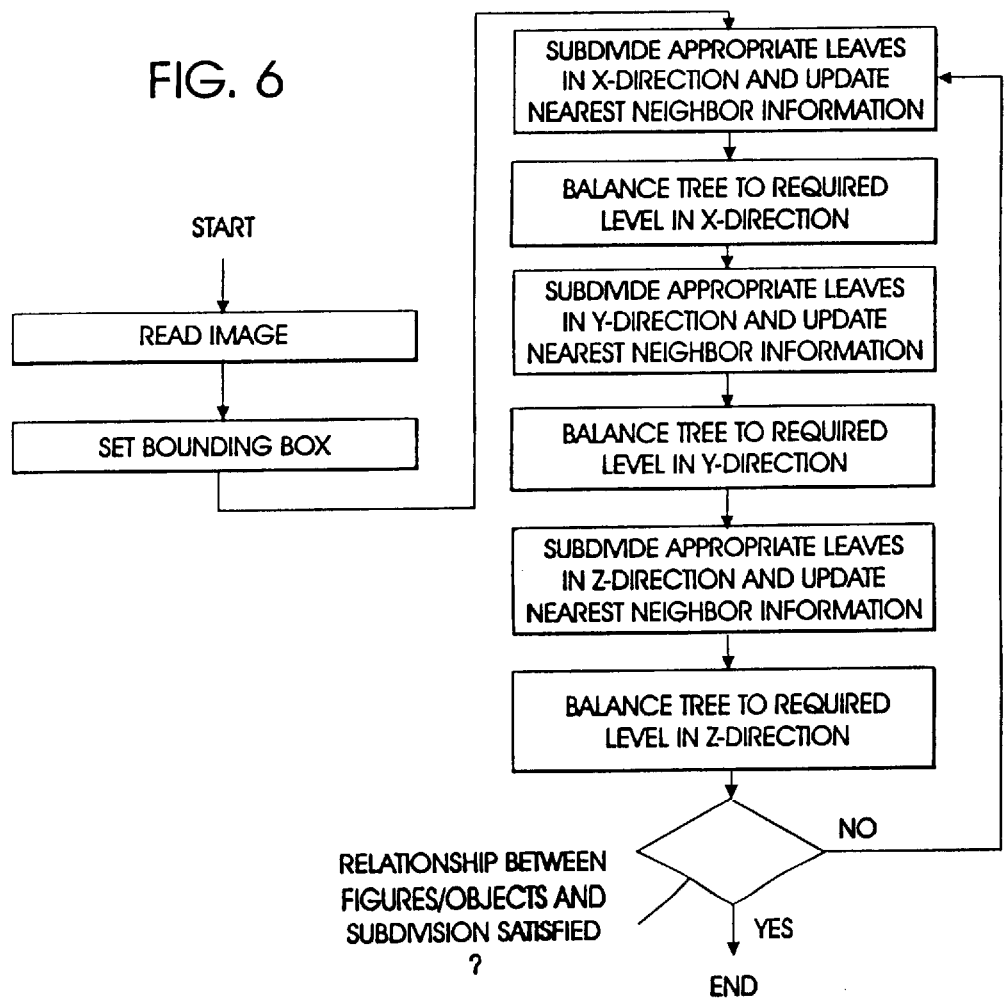

RECURSIVE AND ANISOTROPIC METHOD AND ARTICLE OF MANUFACTURE FOR GENERATING A BALANCED COMPUTER REPRESENTATION OF AN OBJECT

TECHNICAL FIELD OF THE INVENTION

The present invention relates to apparatus, method, and article of manufacture for efficiently storing a computer representation of an object, and more particularly to apparatus, method, and article of manufacture including a means for recursive and anisotropic division of a computer representation of an object.

BACKGROUND OF THE INVENTION

Prior Art.

Many areas of engineering and physics require taking a computer representation of a two-dimensional or three-dimensional object, dividing the representation into pieces and storing the pieces. The division is aimed at providing easier storage, transmission or manipulation of the representation. Examples of fields in which such division is important include (i) the field of mesh generation which arises in computational physics and computer aided design, and (ii) the field of communications where image storage, transmission and representation is fundamental.

In the prior art there are many techniques for subdividing and storing a computer representation of an object. Perhaps the most commonly used methods are the quadtree and octree division methods. The quadtree method applies to representations of two-dimensional objects. The octree method applies to representations of three-dimensional objects. A basic reference describing the quadtree method is M. A. Yerry and M. S. Shepard, A Modified Quadtree Approach to Finite Element Mesh Generation, 3 *IEEE Computer Graphics and Applications* 39 (January/February 1983). Both the quadtree and octree division methods are achieved by the use of simple recursive algorithms that isotropically divide the representation into pieces. In many actual applications the quadtree and octree algorithms are inefficient, because the subdivision process is isotropic (meaning in equal divisions in both the x- and y-directions for a computer representation of a two-dimensional object and in equal divisions in the x-, y-, and z-directions for a computer representation of a three-dimensional object). Both methods are limited in versatility. Of course, the computer representation typically is extremely anisotropic (meaning far from symmetric about the x-, y-, and z-axes).

Examples of prior art that teach or utilize the quadtree or octree division method include (i) Finnigan et al., U.S. Pat. No. 5,345,490, issued Sep. 6, 1994, entitled Method and Apparatus For Converting Computed Tomography (CT) Data Into Finite Element Models, and (ii) Meager, U.S. Pat. No. 4,694,404, issued Sep. 15, 1987, entitled High Speed Image Generation of Complex Solid Objects Using Octree Encoding.

A modification of the quadtree method is taught in Imao, et al., U.S. Pat. No. 4,944,023, issued Jul. 24, 1990, entitled Method of Describing Image Information. The method described in Imao, et al., however, is limited, as the quadtree and octree methods are, by requiring division of regions of the representation into equal subregions.

The present invention also differs from the division method described in M. Tamminen and H. Samet, *Efficient Octree Conversion by Connectivity Labeling*, 18 Computer Graphics 43 (July 1984). The article presents an algorithm for converting an octree or quadtree subdivision into a compact representation of the boundary of the object being analyzed. The division method described in the article divides computer representations into equal halves about a single axis, and cycles through a new axis at each level. The present invention is for constructing a compact representation of the entire volume, not just the boundary. Moreover, the present invention does not require performing the quadtree or the octree division method prior to application of the bitree division method. The present invention is more efficient and more versatile in that it does not require cycling to a new axis at each level.

Although the references cited above generally teach methods of dividing a computer representation, none of the references teach the bitree division method invention taught and claimed herein.

The two-dimensional bitree idea is described in M. Shpitalni, P. Bar-Yoseph and Y. Krimberg, "Finite Element Mesh Generation Via Switching Function Representation", 5 *Finite Elements in Analysis and Design* 119 (1989). However, the article does not describe implementation specifics such as controlling the level variation of adjacent subdivisions, known as "balancing" the subdivisions. Balanced subdivisions are often required for computer-aided design, computational physics and communications applications. Balancing the subdivisions in the context of the quadtree division method is discussed in D. Moore, "Cost of Balancing Generalized Quadtrees", Symposium on Solid Modeling and Applications-Proceedings 1995, 305–311 (ACM, New York 1995).

The three-dimensional bitree idea is not in the literature.

An article published in the IBM Technical Disclosure Bulletin, Vol. 37, No. 04A, April 1994, entitled Method for Geo-Referencing an Octree Data Structure, describes a method for tying an octree data structure to geographic coordinates.

An article published in the IBM Technical Disclosure Bulletin, Vol. 32, No. 8B, January 1990, entitled Two-Pass Antialiasing in Constructive Solid Geometry Rendering, describes a two step method utilizing the quadtree approach for antialiasing a picture. Neither article provides a technique for recursive and anisotropic division of a computer representation that is an alternative to and an improvement of the traditional quadtree or octree division method as is shown and claimed herein.

SUMMARY OF THE INVENTION

An object of this invention is to improve the efficiency of the method used to divide a computer representation of an object into pieces and store the pieces.

A further object of this invention is to remove the restrictiveness of the isotropic division performed by the quadtree and octree division methods.

Accordingly, an information handling system is provided which includes one or more processing units, a memory system, one or more I/O controllers for controlling one or more I/O devices, a system bus connecting the processors, the memory system and the I/O controllers, an operating system program for controlling the processors, the memory system, and the I/O controllers, which provides a user interface, one or more means for generating a computer representation of a three-dimensional object, and means for recursive and anisotropic division of the computer representation to yield resulting subdivisions.

It is an advantage of the present invention that the method provided herein permits efficient, balanced, and anisotropic division of a computer representation of a two-dimensional or three-dimensional object.

It is a further advantage of the present invention that the bitree algorithm of the present invention requires fewer recursive divisions, enables efficient subdivision balancing, and uses less processor time than the quadtree and octree algorithms.

Other features and advantages of the present invention will become apparent in the following detailed description of the preferred embodiment of the invention taken in conjunction with the accompanying drawings.

BRIEF DESCRIPTION OF THE DRAWINGS

FIGS. 3(a–c) are a depiction of the quadtree algorithm and associated data structure.

FIG. 5 is a depiction of the two-dimensional bitree data structure with adjacency pointers in accordance with a preferred embodiment of the present invention.

FIG. 6 is a flowchart showing the operation of a preferred embodiment of the three-dimensional bitree division method of the present invention.

DETAILED DESCRIPTION OF A PREFERRED EMBODIMENT OF THE INVENTION

Figure 1:
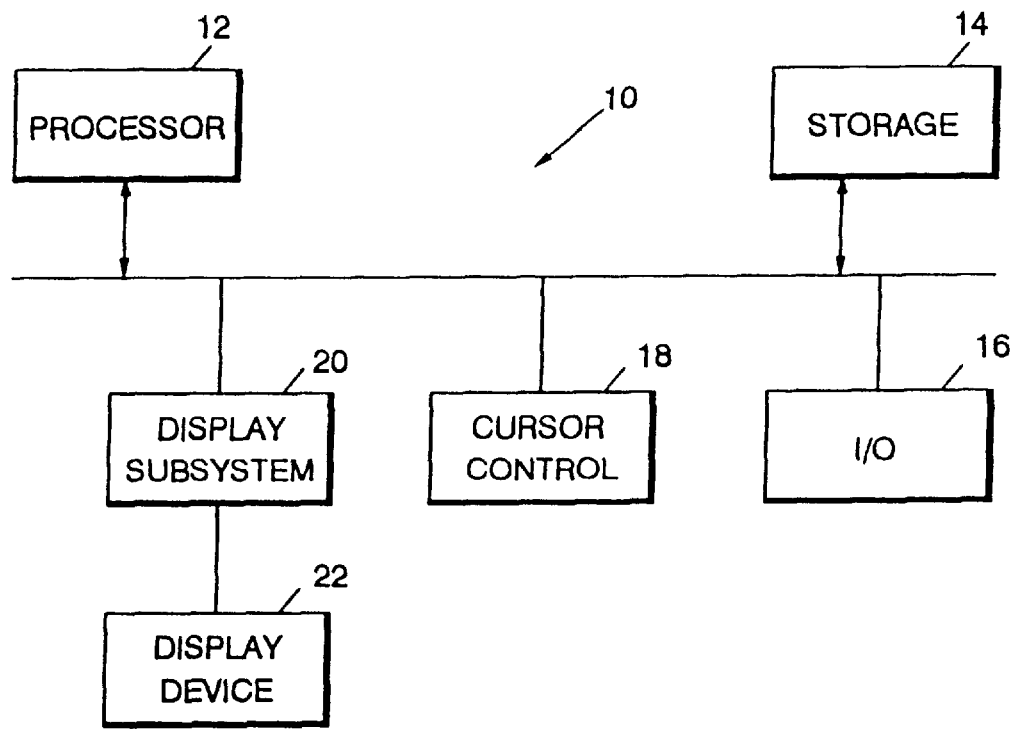
FIG. 1 is a block diagram of an information handling system implementing the present invention.

Referring now to FIG. 1, an information handling system implementing the present invention will be described.

Information handling systems 10 can include one or more processing units 12, a memory system 14, one or more I/O controllers 16 which connect to I/O devices, to a cursor control system 18, and to a display subsystem 20, including a display device 22. An example of a processor suitable for performing the division accomplished by the present invention is the IBM RS/6000 590 CPU.

Each of the information handling system units identified above are well known in the art and will not be described in greater detail herein.

Figure 2:
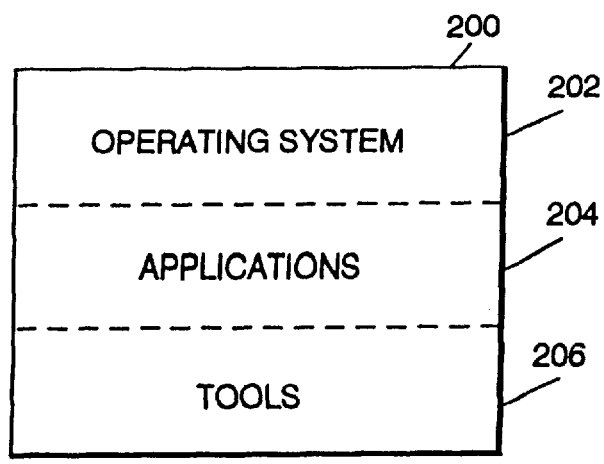
FIG. 2 is a schematic diagram of an operating system environment in accordance with the present invention.
Figure 4A:
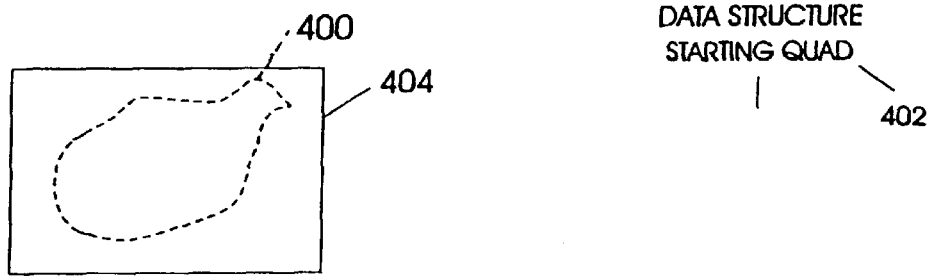
FIGS. 4(a–e) are a depiction of the two-dimensional bitree division method and associated data structure of the present invention.
Figure 4B:
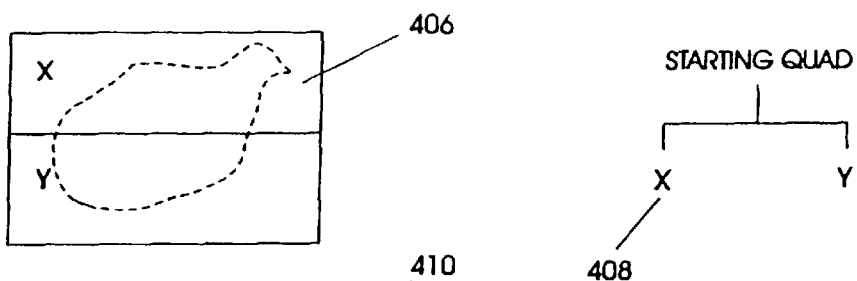
Figure 4C:
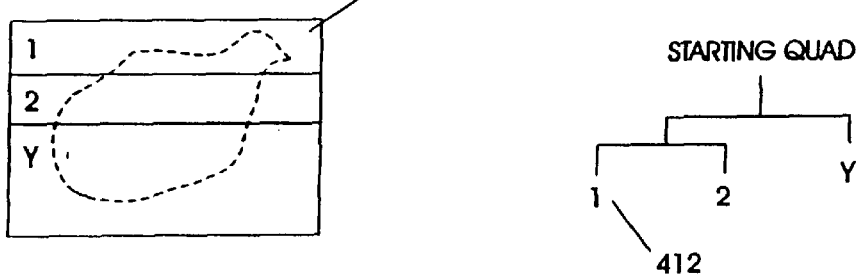
Figure 4D:
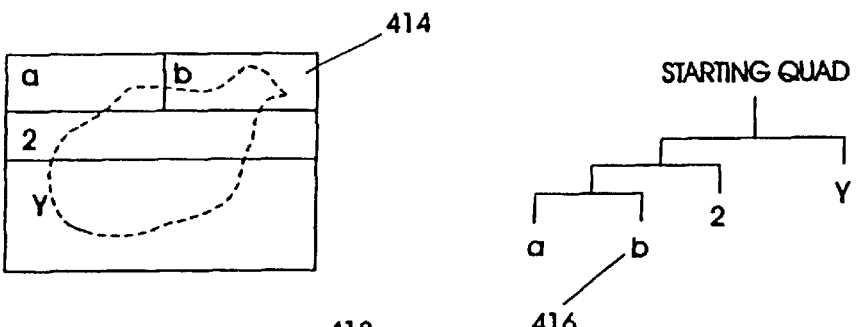
Figure 4E:
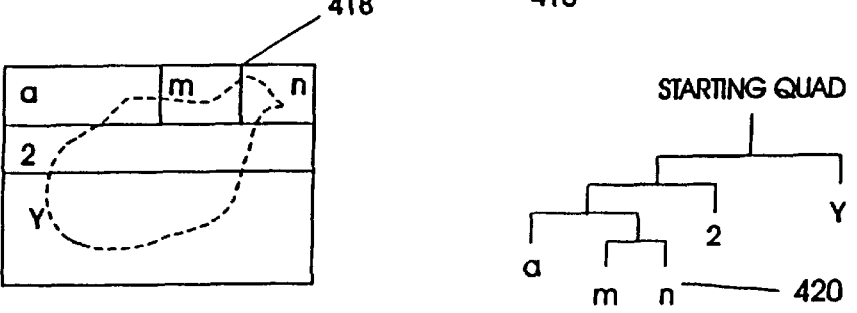

Referring now to FIG. 2, the operating system environment in accordance with the present invention will be further described.

Operating system environment 200 includes an operating system 202 such as the IBM AIX operating system, one or more applications programs 204, and one or more tools 206. The user interface and the computer representation of a two-dimensional or three-dimensional object presented at the user interface may be generated either by operating system 202 or application program 204 such as a computer program which implements the recursive, anisotropic bitree division method of the present invention.

FIG. 3 depicts a computer representation of a two-dimensional object 300 to which the quadtree algorithm is applied and associated data structure 302 of the quadtree algorithm. In FIG. 3 the quadtree algorithm is applied to a two-dimensional anisotropic computer representation 300 of a two-dimensional object. In the first step, a bounding box 304 is drawn around the computer representation 300. The bounding box 304 forms the starting quad 306 in the data structure 302. In the second step, the quadtree algorithm isotropically subdivides the bounding box 304 into four equal pieces (known as quads), including a quad Z 308, by subdividing the two-dimensional plane in both the x-direction and y-direction to form four quadrants. The associated data structure 302 shows four branches, each with one leaf, including a leaf Z 310. In the third step, quad Z 308 is subdivided isotropically in the same manner by the quadtree algorithm into four equal quads, 312, labeled 1 through 4. The associated data structure 302 shows four branches, 314, each with one leaf labeled 1 through 4, at level two. The subdivision typically continues recursively until criteria restricting the degree of intersection of the computer representation and the quads are met. Note that each quad is associated with a level in the data structure. Typically, physically neighboring quads are required to differ by no more than one level in the data structure. This restriction is called "balancing". The quadtree algorithm is well known in the prior art.

The octree algorithm is the three-dimensional variant of the quadtree algorithm described in FIG. 3. In the octree algorithm, the bounding box is divided into eight equal pieces by subdividing the three-dimensional bounding box in the x, y, and z-direction to form eight equal three-dimensional sub-boxes. Each piece can then in turn be further subdivided into eight equal pieces. The octree algorithm also is well known in the prior art.

Both the quadtree and octree algorithms are limited by the isotropic nature of the subdivision performed by each. Although the computer representation of the object often is anisotropic, the recursive subdivision performed by both the quadtree and octree algorithms can only be isotropic.

The present invention generalizes the quadtree and octree approaches such that the subdivision performed can be done anisotropically. The present invention also provides a method to efficiently store, and dynamically update, the information that each subdivision stores about its neighboring subdivisions in order that the required degree of balancing can be efficiently achieved. This yields greater efficiency when applied to anisotropic computer representations of objects. The present invention is called the bitree division method. It can be applied to computer representations of two-dimensional or three-dimensional objects.

FIG. 4 shows the operation of the two-dimensional bitree division method of the present invention on computer representation 400 of a two-dimensional object and the associated data structure 402. In the first step a bounding box 404 is placed around the computer representation 400. In the second step, the bounding box is subdivided into two equal horizontal rectangles, including a rectangle X 406, by dividing the bounding box 404 in the x-direction. The associated data structure 402 shows two branches, each with one leaf at level one, including a leaf X 408. In the third step, the rectangle X 406 is further subdivided horizontally into two equal rectangles, including one labeled 1 410. The associated data structure 402 shows two branches, each with one leaf, including a leaf labeled 1 412, at level two. In the third step, rectangle 1 410 is further subdivided, this time vertically, into two equal rectangles, one of which is labeled b 414, by dividing rectangle 1 410 in the y-direction. The associated data structure 402 shows a third level with two branches, each with one leaf, including a leaf labeled b 416. In the fourth step, rectangle b 414 is further subdivided vertically into two equal rectangles 418, labeled m and n. The associated data structure 402 shows a fourth level with two branches, each with one leaf, labeled m and n 420, respectively. The subdivision typically will continue in like manner until criteria determining the degree of intersection of the computer representation of the object and the rectangles are met.

By reference to FIG. 4, it is clear that the bitree division method accommodates recursive division of the bounding box and resulting rectangles in one of two possible ways— namely, either into further equal rectangles by the addition of a horizontal (i.e., the x-direction) or a vertical (i.e., the y-direction) line. Steps 1 and 2 in FIG. 4 show division by horizontal lines. Steps 3 and 4 show division by vertical lines. With each division, the associated data structure adds a new level with two branches, each having one leaf, rather than the eight leaf per level data structure of the octree division method or the four leaf per level data structure of the quadtree division method.

The three-dimensional bitree division method is the three-dimensional variant of the two-dimensional division method in FIG. 4. The three-dimensional bitree division method accommodates recursive division of the bounding box and resulting three-dimensional boxes into further equal boxes by division along lines parallel to the x, y, or z axis. The data structure associated with the three-dimensional bitree division method is identical to that of the data structure 402 of the two-dimensional bitree division method shown in FIG. 4.

The data structure for the three-dimensional bitree division method is generated in the C programming language as follows:

```
struct bitree {
        struct bitree *child0;
        struct bitree *child1;
        double x0,y0,z0;
        double x1,y1,z1;
        double x2,y2,z2;
        double x3,y3,z3;
        int x_level;
        int y_level;
        int z_level;
        }
```

This data structure assumes that no constraint on the difference in levels of adjacent subdivisions is required.

If physically neighboring subdivisions are required to differ by no more than one level in the data structure, then the data structure in the C programming language is as follows:

```
struct bitree {
        struct bitree *parent;
        struct bitree *child0;
        struct bitree *child1;
        struct bitree *adjacent_up[16];
        struct bitree *adjacent_down[16];
        struct bitree *adjacent_north[16];
        struct bitree *adjacent_south[16];
        struct bitree *adjacent_east[16];
        struct bitree *adjacent_west[16];
        double x0,y0,z0;
        double x1,y1,z1;
        double x2,y2,z2;
        double x3,y3,z3;
        double x4,y4,z4;
        double x5,y5,z5;
        double x6,y6,z6;
        double x7,y7,z7;
        int x_level;
        int y_level;
        int z_level;
        }
```

Shown below is the data structure in the C programming language for the two-dimensional bitree division method if physically neighboring subdivisions are required to differ by no more than one level in the data structure.

```
struct bitree {
        struct bitree *parent;
        struct bitree *child0;
        struct bitree *child1;
        struct bitree *adjacent_up[4];
        struct bitree *adjacent_down[4];
        struct bitree *adjacent_right[4];
        struct bitree *adjacent_left[4];
        double x0,y0;
        double x1,y1;
        double x2,y2;
        double x3,y3;
        int x_level;
        int y_level;
        }
```

These data structures would be incorporated into application programs in the information handling system described in FIGS. 1 and 2.

Referring now to FIG. 5, this Figure illustrates a utilization of the two-dimensional bitree data structure described in the foregoing C programming language code. As shown in FIG. 5, each subdivision is linked to succeeding subdivisions and to neighboring subdivisions. As the subdivision process proceeds, the information about adjacent subdivisions is updated dynamically. For example, by examining the y-levels of subdivisions A 502, C 504, and D 506, it is clear that to enforce a one level difference in the levels of the subdivisions, subdivision A 502 must be further subdivided in the y-direction, that is, by a horizontal line bisecting subdivision A 502.

When quad A 502 is further subdivided, the following steps occur:
 (1) quad A 502 is subdivided via a bisecting horizontal line into an upper quad (child0) and a lower quad (child1).
 (2) for the upper quad, adjacent_right[3] and adjacent_right[2] point to quad D 506, and adjacent_right[1] and adjacent_right[0] point to quad C 504.
 (3) for the lower quad, adjacent_right[i], i=0,1,2,3, all point to quad B.

Similarly, the neighbor information in quads D 506, C 504 and B are all updated to reflect the subdivision of quad A 502 into a lower quad and an upper quad.

A one level difference restriction is the usual mode of use in the quadtree and octree division methods. The bitree division method can be expanded to accommodate any desired level difference.

FIG. 6 is a flow chart showing the operation of a preferred embodiment of the three-dimensional bitree division method and data structure of the present invention. The application program incorporating the present invention first must read the computer representation of the three-dimensional object. The application program then must set the bounding box around the computer representation of the image. The application program then must subdivide appropriate leaves in the x-direction, y-direction, and the z-direction. If the tree is to be balanced, the application program also must update the nearest neighbor information and balance the tree as required in the x-direction, y-direction, and z-direction. The subdivision process continues until the required criteria restricting the degree of intersection of the computer representation and the rectangles (in two-dimensions) or boxes (in three-dimensions) are met.

The operation of the two-dimensional bitree division method and data structure is identical to the flowchart of FIG. 6, except that there is no subdivision or balancing in the z-direction.

FIGS. 7 through 12 show the application of the bitree division method to real life problems and demonstrate the efficiency of the bitree division method of the present invention over the quadtree and octree methods of the prior art.

Figure 7:
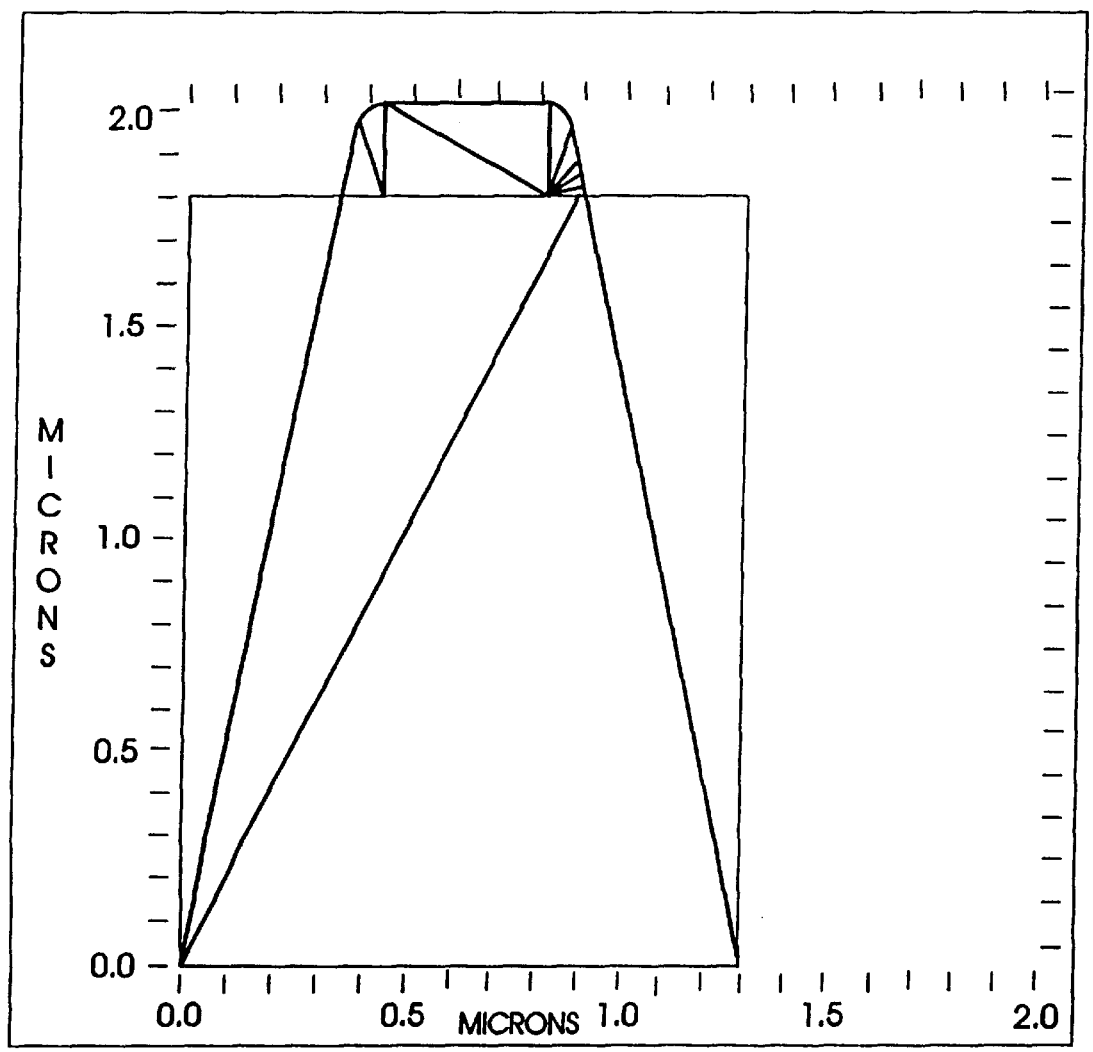
FIG. 7 is a depiction of a computer representation of a typical field-effect transistor cross section.

FIG. 7 shows a computer representation of a two-dimensional cross-section of a field-effect transistor. The computer representation shows the material types and dopant impurity concentrations associated with this cross-section.

Figure 8:
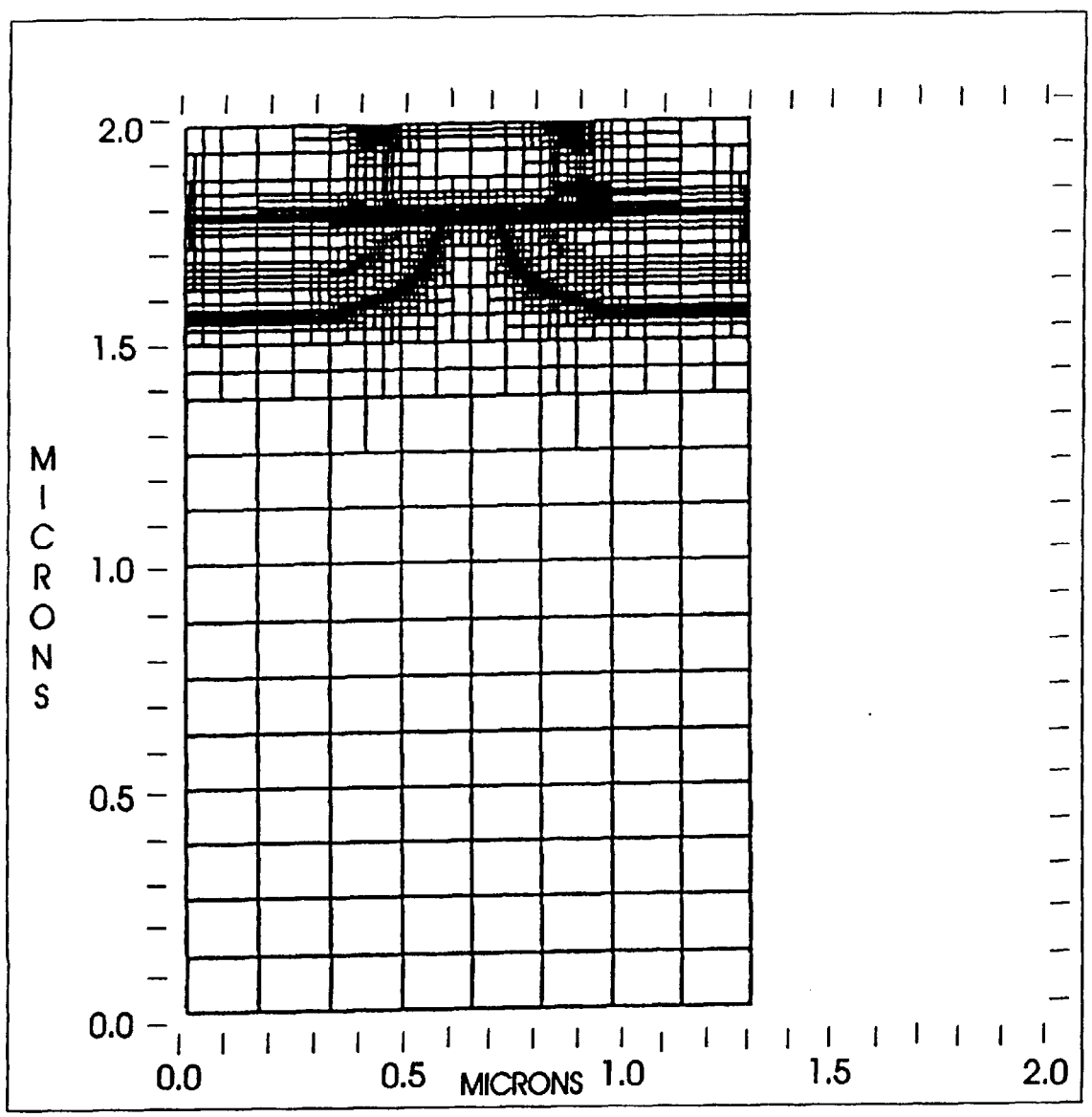
FIG. 8 is a depiction of the computer representation of FIG. 7 after application of the two-dimensional bitree division method of the present invention.

FIG. 8 shows the result after application of the two-dimensional bitree division method to the computer representation of FIG. 7. The material interfaces and associated doping concentrations were used as criteria for the division rules used to achieve the representation of FIG. 8. The complex structure shown in FIG. 7 has been computationally reduced to the tree structure associated with the bitree shown in FIG. 8.

Figure 9:
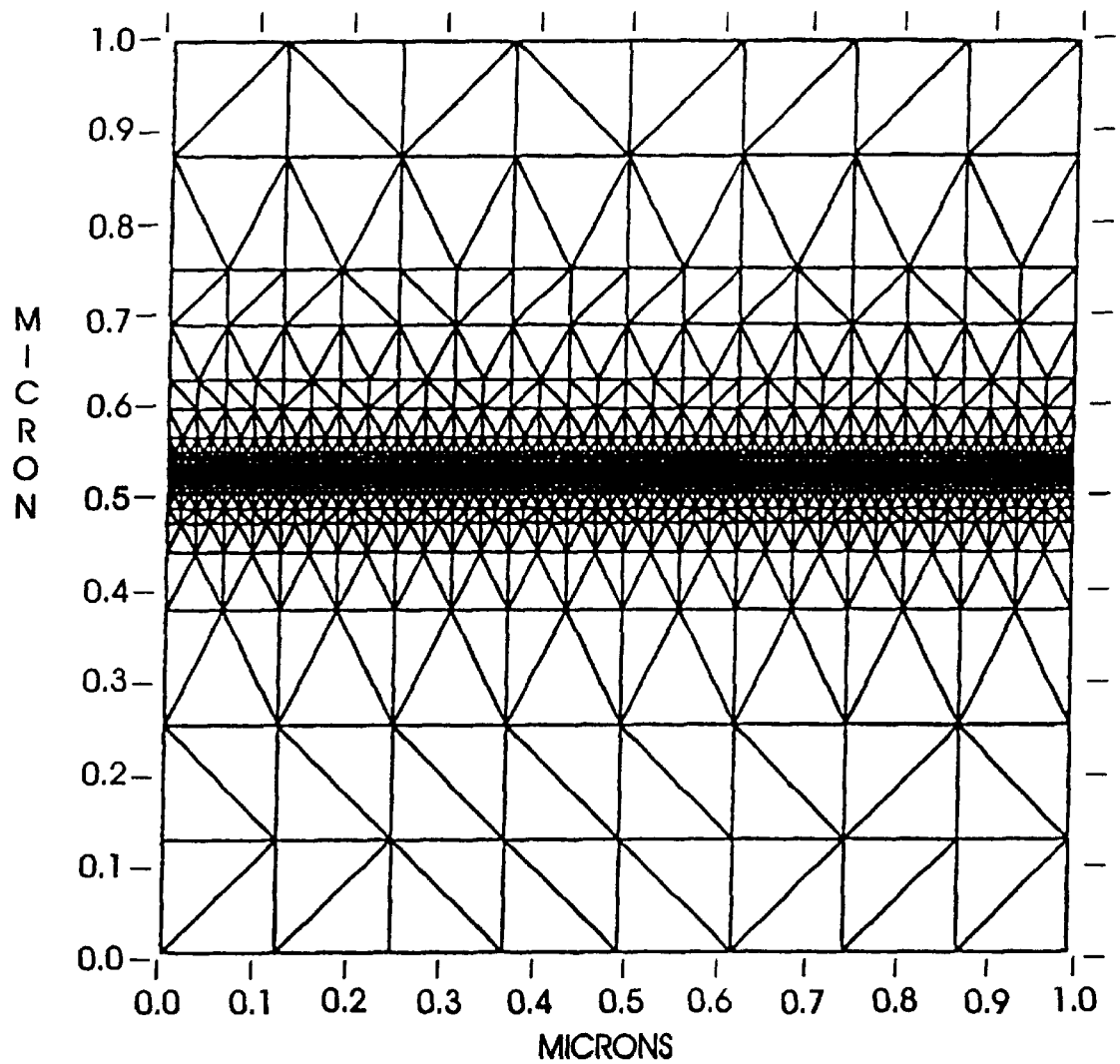
FIG. 9 is a depiction of a two-dimensional p-n junction diode after application of the quadtree division method of the prior art. The rectangular subdivisions have been further subdivided into triangles for application of the finite-element method for numerical computer solution of partial differential equations.
Figure 10:
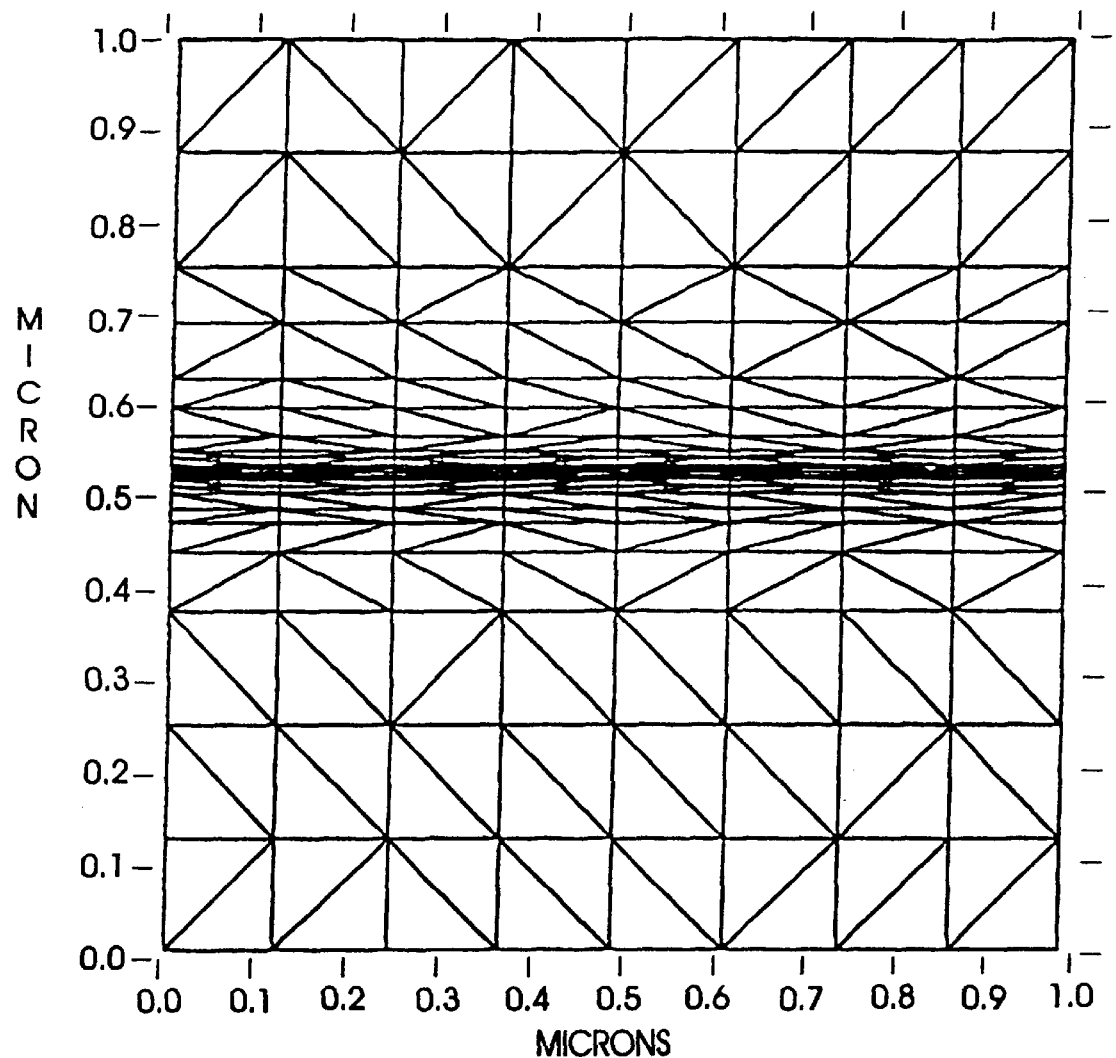
FIG. 10 is a depiction of the same two-dimensional p-n junction diode used in FIG. 9 after application of the two-dimensional bitree division method of the present invention. The rectangular subdivisions have been further subdivided into triangles for application of the finite-element method for numerical computer solution of partial differential equations.

FIGS. 9 and 10 demonstrate the advantages of the anisotropic bitree recursive division method of the present invention over the isotropic quadtree recursive division method approach of the prior art. Both subdivision methods have been applied to a computer representation of a block of silicon containing a steeply graded p-n junction diode. The impurity profile of the diode varies only in the y-direction. The junction lies approximately at y=0.52 microns in the cross section shown. Adjacent subdivisions were required to contain impurity concentrations that did not differ by more than a given amount.

FIG. 9 shows the result after application of the quadtree division method, where the final quadtree divisions have been further divided into triangles for application of the finite-element method. The quadtree has been balanced so that adjacent subdivisions differ by no more than one level of refinement in either the x- or y-direction.

FIG. 10 shows the result after application of the two-dimensional bitree division method to the same computer representation of the diode. As in FIG. 9, the final subdivisions have been further divided into triangles for application of the finite element method. The bitree has been balanced so that adjacent subdivisions differ by no more than one level of refinement in either the x- or y-direction.

In comparing FIG. 9 to FIG. 10, it is clear that the quadtree division method of FIG. 9 requires many more divisions to store the identical information than does the bitree division method of FIG. 10. The bitree division method is more efficient because division can take place in either the x or y-direction, while in the quadtree division method, division must take place (if at all) in both the x and y-directions. Similarly, the octree division method of the prior art requires division (if at all) in the x, y, and z-directions. The three-dimensional bitree division method permits division in any one direction at a time.

Figure 11:
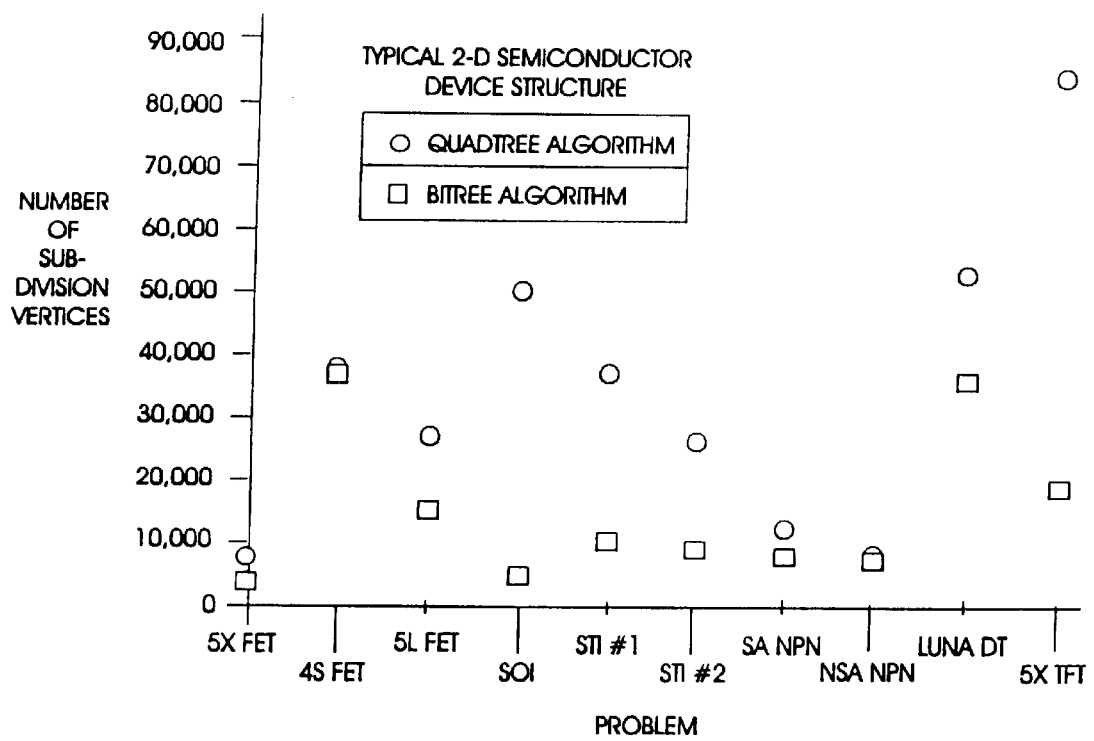
FIG. 11 is a chart showing a comparison of the number of divisions required using the quadtree and bitree division methods, respectively, to decompose several typical semiconductor devices.

FIG. 11 shows a comparison of the number of subdivisions required using the quadtree and bitree division methods, respectively, to decompose various two-dimensional cross-sections of typical semiconductor devices. FIG. 11 demonstrates that the bitree division method is generally much more efficient than the quadtree division method.

Figure 12:
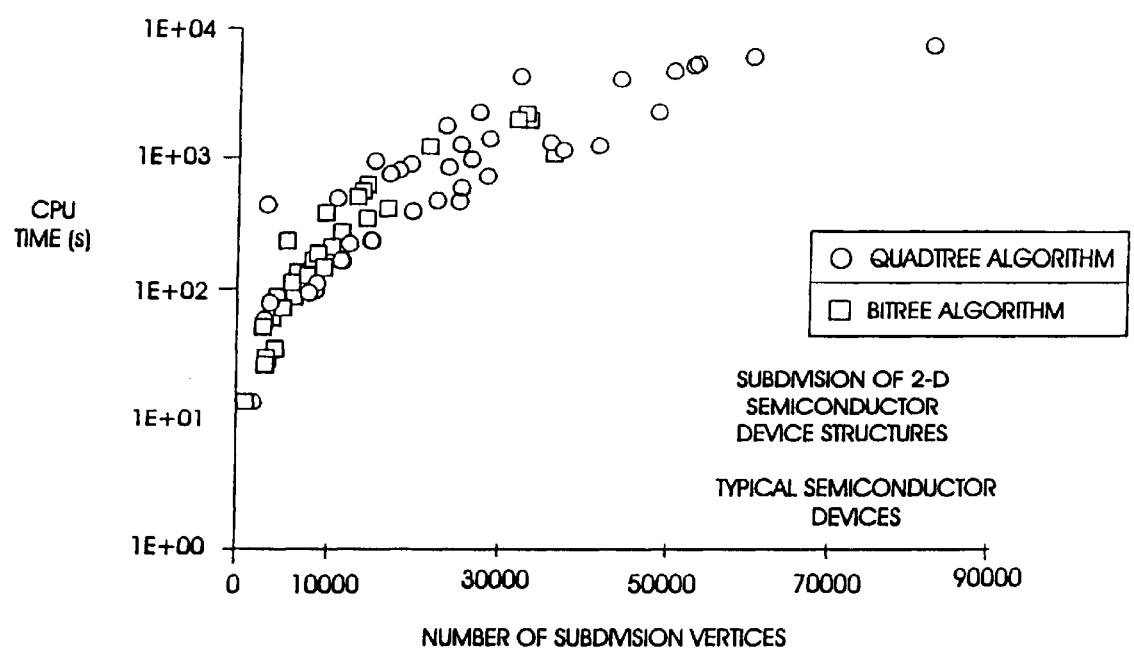
FIG. 12 is a chart showing a comparison of the time required, using the quadtree and bitree division methods, respectively, to decompose several typical semiconductor devices.

FIG. 12 shows the CPU time required using the quadtree and bitree division methods, respectively, to decompose various two-dimensional cross-sections of typical semiconductor devices. The bitree division method clearly is generally faster than the quadtree division method, since for a given number of subdivisions no greater CPU time is required and the bitree subdivision method typically requires fewer subdivisions for any given level of subdivision granularity.

Much greater efficiencies are expected in three-dimensional applications.

Although a specific embodiment and examples of its application have been described herein for the purposes of illustration, various modifications may be made without departing from the spirit or scope of the invention.

Accordingly, the scope of this invention is limited only by the following claims and their equivalents.

What is claimed is:

1. An information handling system, comprising:
    one or more processing units;
    a memory system;
    one or more I/O controllers for controlling one or more I/O devices;
    a system bus connecting the processors, the memory system and the I/O controllers;
    an operating system control means for controlling operation of the processors, the memory system, and the I/O controllers;
    one or more means for generating a computer representation of a three-dimensional object;
    means for recursive and anisotropic division of the computer representation to yield resulting subdivisions;
    means for generating a data structure for each subdivision of the computer representation, wherein said data structure is efficiently stored in said memory system and contains information linking the subdivision to its succeeding and neighboring subdivisions;
    means for updating said data structure information after each of said divisions of said computer representation in order that balancing is continuously and dynamically achieved; and
    a display device connected to one or more I/O controllers for displaying a user interface of the computer representation and the resulting subdivisions.

2. An information handling system, according to claim 1, further comprising:

one or more application programs operating under control of the operating system control means for controlling and generating said computer representation of the three-dimensional object and resulting subdivisions.

3. An information handling system, according to claim 1, further comprising:

means for storing in the memory system the resulting subdivisions.

4. An information handling system, according to claim 1, further comprising:

means for recursively continuing the division of the computer representation until a desired degree of balancing is met between the computer representation and the resulting subdivisions.

5. A method for recursively and anisotropically describing a computer representation of a three-dimensional object displayed in an information handling system by a tree data structure in accordance with a programmed set of criteria, comprising the steps of:

first, reading the computer representation from a memory system;

second, setting a bounding box around the computer representation thereby making a starting quad of the tree data structure;

third, subdividing the bounding box into two equal resulting sub-boxes by dividing the bounding box in either the x-direction, the y-direction, or the z-direction, in accordance with the programmed set of criteria, thereby making a first level of said tree data structure having a root node corresponding to the starting quad and having two branches each with two leaves corresponding to each of said two equal resulting sub-boxes;

fourth updating said tree data structure information in order that balancing of said tree data structure is continuously and dynamically achieved;

fifth, recursively and equally subdividing a resulting sub-box into further resulting sub-boxes by dividing the resulting sub-box in either the x-direction, the y-direction, or the z-direction, in accordance with the programmed set of criteria; and sixth, determining whether the programmed set of criteria have been met and, if not, repeating said fourth, fifth and sixth steps, and if so, ending the subdivision process.

6. A method for recursively and anisotropically describing a computer representation of a three-dimensional object displayed in an information handling system by a tree data structure, according to claim 5, wherein each node includes adjacency pointer information linking each resulting sub-box to its neighboring resulting sub-boxes.

7. A method for recursively and anisotropically describing a computer representation of a three-dimensional object displayed in an information handling system by a tree data structure, according to claim 5, further comprising storing in a memory subsystem the resulting sub-boxes.

8. An article of manufacture, comprising:

a computer readable medium, comprising:

one or more means for generating a computer representation of a three-dimensional object;

means for recursive and anisotropic division of the computer representation to yield resulting subdivisions;

means for generating a data structure for each subdivision of the computer representation, wherein said data structure is efficiently stored in said memory system and contains information linking the subdivision to its succeeding and neighboring subdivisions; and means for updating said data structure information after each of said divisions of said computer representation in order that balancing is continuously and dynamically achieved.

9. An article of manufacture, according to claim 8, further comprising:

means for storing in a memory system the resulting subdivisions.

10. An article of manufacture, according to claim 8, further comprising:

means for recursively continuing the division of the computer representation until a desired degree of balancing is met between the computer representation and the resulting subdivisions.

11. A method for recursively and anisotropically describing a computer representation of a three-dimensional object displayed in an information handling system, the method comprising the steps of:

generating the computer representation of the three-dimensional object;

recursively and anisotropically dividing the computer representation to yield resulting subdivisions;

generating a data structure for each subdivision of the computer representation, wherein said data structure is efficiently stored in a memory subsystem and contains information linking the subdivision to its succeeding and neighboring subdivisions; and updating said data structure after each of said divisions of said computer representation in order that balancing is continuously and dynamically achieved.

12. The method of claim 11, further comprising the step of:

storing in a memory system the resulting subdivisions.

13. The method of claim 11, further comprising the step of:

recursively continuing the division of the computer representation until a desired degree of balancing is met between the computer representation and the resulting subdivisions.

* * * * *